Broomell & Wilson,
Saw Hanging.
No. 102,653. Patented May 3, 1870.
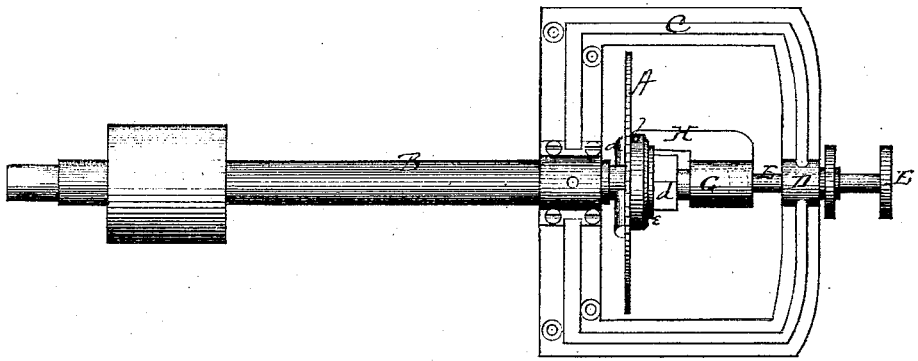

United States Patent Office.

HENRY BROOMELL AND ALBIN W. WILSON, OF CHRISTIANA, PENNSYLVANIA.

Letters Patent No. 102,653, dated May 3, 1870.

IMPROVEMENT IN SAW.

The Schedule referred to in these Letters Patent and making part of the same.

*To all whom it may concern:*

Be it known that we, HENRY BROOMELL and ALBIN W. WILSON, of Christiana, in the county of Lancaster and State of Pennsylvania, have invented certain new and useful Improvements in Drunker or Wabble-Saws; and we do hereby declare that the following is a full, clear, and exact description thereof, reference being had to the accompanying drawings and to the letters of reference marked thereon, which form a part of this specification.

Our invention is an improvement in grooving-saws, or what is commonly known as "drunker or wabble"-saws, and consists in the manner in which the saw is thrown at any desired angle with the plane of motion, and maintained in that position, so as to cut any width of groove that may be desired, which change in the position of the saw may be effected whether the saw is in motion or at rest.

In order to enable others skilled in the art to which our invention appertains to make and use the same, we will now proceed to describe its construction and operation, referring to the annexed drawings, which represent a side view of our device.

A represents a circular saw, which is secured upon the mandrel B, between a pin, $a$, on one side, said pin passing through the mandrel or spindle and a hard-rubber washer or cushion, $b$, on the other side.

This cushion is kept tight against the saw by means of a nut, $d$, and thin iron washer $e$.

By this arrangement a lateral movement may be given to the saw in one direction, while it is held firmly and at right angles to the mandrel in the other direction by the pin.

Attached to the box inclosing the journal, next the saw, and forming a part of the same, is a frame, C, passing around and inclosing the saw, and having an enlargement or boss, D, opposite the end of the mandrel, through which passes a set-screw, E, the center or axis of which is exactly in line with the center or axis of the mandrel B.

Upon the end of the mandrel, and outside the nut $d$, is placed a sliding cap, G, with a finger, H, projecting in the direction of the saw.

This cap is moved, and the finger pressed against the saw, by means of the set-screw E, just described.

By this pressure the saw, compressing the rubber cushion on the opposite side, is thrown out of a right-angular position to the mandrel, so that the saw, when running, has a zigzag or wabbling motion, which causes it to saw a broader "kerf" or groove than when running true.

When the pressure of the finger H is removed, the elastic character of the rubber washer $b$ causes the saw to resume a true position.

The rubber washer $b$ is a little thicker on the side opposite the finger H than elsewhere, so that a slight pressure may be kept up by the set-screw when it is desired to have the saw run true, which it might not do if left wholly to the influence of the washer.

In place of the rubber washer, we may use a spring of any other form or material suitable for the purpose.

The saw is prevented from turning on the mandrel by a notch fitting on a projection of the pin, $a$, and the cap G is held in place in a similar manner.

The rubber washer is kept in proper position by being notched around the finger H.

The set-screw E is provided with a set-nut, I, for securing it in place when the saw has been set as desired.

The advantages of this invention are—

First, the saw may be set, while in motion for sawing any desired width of groove, with perfect accuracy and great economy of time.

Second, while mainly intended for grooving, it is well adapted for light ordinary sawing, and may be set for either by the simple movement of the set-screw.

Third, it constitutes a cheap, durable, and efficient machine for the purpose intended.

Having thus fully described our invention,

What we claim as new, and desire to secure by Letters Patent, is—

1. The saw A and set-screw E, placed centrally in line with the mandrel, and operating as and for the purpose described.

2. The sliding cap G, with projecting finger H, arranged and operating substantially in the manner and for the purposes herein set forth.

3. The hard-rubber cushion or washer $b$, or an equivalent spring of any form or material, when used to operate against the pressure of the projecting finger H of the sliding cap G, substantially as and for the purposes herein set forth.

In testimony that we claim the foregoing as our own, we affix our signatures in presence of two witnesses.

HENRY BROOMELL.
ALBIN W. WILSON.

Witnesses:
ISAAC T. WILSON,
ISAAC BROOMELL.